UNITED STATES PATENT OFFICE.

PETER FIREMAN, OF TRENTON, NEW JERSEY, ASSIGNOR TO MAGNETIC PIGMENT COMPANY, A CORPORATION OF NEW YORK.

PIGMENT AND METHOD OF PRODUCING SAME.

1,392,927.     Specification of Letters Patent.     Patented Oct. 11, 1921.

No Drawing.     Application filed June 22, 1920. Serial No. 390,811.

*To all whom it may concern:*

Be it known that I, PETER FIREMAN, a citizen of the United States, residing at Trenton, in the county of Mercer, State of New Jersey, have invented certain new and useful Improvements in Pigments and Methods of Producing the Same; and I do hereby declare the following to be a full, clear, and exact description of the invention, such as will enable others skilled in the art to which it appertains to make and use the same.

This invention relates to colored pigments produced by oxidation of ferrous hydroxid under regulated conditions and has for its object the production in a relatively inexpensive manner of brown pigments, particularly those exhibiting tan shades and adapted for application to various purposes.

The numerous advantages of the invention will be apparent upon reference to the following specification in which I have described a preferable mode of procedure in producing the pigments. It is to be understood that the description of the invention is illustrative merely and that various modifications may be introduced through substitution of other than the specific materials and by variation of the relative proportions of these materials, and the temperatures employed, within the scope of the accompanying claims, it being my intention to claim as my invention the method whereby the advantageous results hereinafter described are accomplished, as well as the products of this method.

In United States Letters Patent Nos. 802,928 and 857,044, the treatment of freshly precipitated ferrous hydroxid to produce a certain black pigments has been fully described. These pigments have a chemical composition which is indicated, for example, by the formula $FeO.Fe_2O_3$. In the earlier of these patents, the pigments produced contain ferrous and ferric iron in the ratio of 1:2, whereas the second patent describes a product in which the ratio of ferrous to ferric iron varies from 1:0.5 to 1:2. In producing these pigments the freshly precitated ferrous hydroxid is oxidized with air while it is suspended in the mother liquor which is maintained at a relatively high temperature in the neighborhood of 185° to 203° F. Oxidation is controlled to the extent that when the required ratio of ferrous to ferric iron has been obtained the reaction is stopped and care is taken to prevent subsequent oxidation beyond the desired ratio. As pointed out, the temperature at which the reaction is conducted is relatively high throughout and no variation in the proportion of the precipitant, or the mode of conducting the oxidation to produce other than black pigments is suggested in the patents.

Subsequent research has disclosed that a variety of products depending upon various factors are produced by oxidizing freshly precipitated ferrous hydroxid. When the reaction is relatively uncontrolled as in the patents above referred to, a black precipitate of ferro-ferric oxid is produced. When, however, variations are made in the completeness of precipitation and oxidation is carried out under lower temperatures, the reaction may be directed to produce colored pigments and particularly brown pigments exhibiting tan shades and having a chemical composition indicated by the formula $Fe_2O_3$ carrying 4–6% of water hydration. The pigment has a brilliant color of high luster. It is voluminous and absorbs about 4 times as much oil as ordinary zinc white. The pigment may be applied to various uses and is especially adapted to form the body of printing ink.

In carrying out the invention it is preferable to employ a mother liquor of ferrous chlorid although other ferrous salts, such as sulfate, are available. As a precipitant, calcium hydroxid is advantageously used but it is to be understood that other soluble hydroxids or carbonates capable of separating iron as ferrous hydroxid may be substituted. Air is preferably employed as an oxidizing agent but oxygen or the gaseous mixtures containing oxygen are also available. The mother liquor is heated by means of steam which is preferably introduced with the air to produce the desired temperature. The amount of steam admitted must be carefully regulated so that the temperature of the material does not rise above a predetermined maximum and preferably the increase of temperature occurs gradually in starting the reaction and over a considerable period of time. This reaction is carried out in any suitable container or tank which is preferably constructed to permit the dissemination of air and steam through the liquid.

As a specific example of the application of the invention, a current of air is directed into and disseminated through a dilute solution of ferrous chlorid having a specific gravity of 1.05 to which calcium hydroxid has been added in quantity sufficient only to partially precipitate the iron. Steam is supplied with the air to raise the temperature to substantially 105° F. and oxidation is completed between this temperature and substantially 130° F. Oxidation will be complete in the course of a few hours and by varying within narrow limits the degree of temperature, a series of pigments are obtained covering a range of tan shades, the pigment being voluminous and lustrous in color, when separated from the mother liquor and dried. Drying is preferably conducted at low temperatures to avoid separation of the water of hydration which apparently plays an important part in imparting the desired characteristics to the pigment. The condition surrounding the reaction must be carefully guarded inasmuch as, if heated too energetically, black ferro-ferric oxid is produced.

The foregoing example will enable anyone skilled in the art to practice the invention and to produce pigments of the color and character described. Variation in the factors affecting the reaction will result in variation in the color of the pigment, and such variations are within the scope of the invention, which depends upon the discovery that colored pigments may be produced by regulated oxidation of freshly precipitated ferrous hydroxid with careful attention to the details of temperature and mode of directing the reaction.

The possibility of economically producing desirable pigments in quantity sufficient to meet increasing demands for such material will be readily appreciated. The raw materials for the production of pigments in accordance with the invention are readily available in the market and may be obtained in any quantity desired at a slight expense. No peculiar apparatus is essential to the practice of the invention and it is deemed unnecessary, therefore, to illustrate or describe an apparatus inasmuch as any chemist can readily devise, from materials at hand, suitable apparatus for the purpose.

I claim:

1. As an article of manufacture, a brown pigment in tan shades consisting of an oxidized precipitated-ferrous hydroxid.

2. As an article of manufacture, a brown pigment in tan shades produced by the oxidation of precipitated-ferrous hydroxid.

3. As an article of manufacture, a brown pigment in tan shades having a chemical composition indicated by the formula $Fe_2O_3$ with 4 to 6% of water of hydration.

4. As an article of manufacture, a lustrous brown pigment in tan shades consisting of an oxid of iron carrying 4 to 6% of water of hydration.

5. A method of preparing brown pigments in tan shades which comprises, oxidizing precipitated-ferrous hydroxid in the mother liquor at temperatures substantially between 105° and 130° F.

6. A method of preparing brown pigments in tan shades, which comprises, adding an alkali earth metal hydroxid to a solution of an iron salt and oxidizing the precipitated-ferrous hydroxid at temperatures below 130° F.

7. A method of preparing brown pigments in tan shades which comprises, adding calcium hydroxid to a solution of an iron salt and oxidizing the precipitated-ferrous hydroxid at temperatures below 130° F.

8. A method of preparing brown pigments in tan shades which comprises, adding an alkali earth metal hydroxid to a solution of a ferrous salt to precipitate a portion of the iron as ferrous-hydroxid and oxidizing the precipitate at temperatures below 130° F.

9. A method of preparing brown pigments in tan shades which comprises, adding calcium hydroxid to a solution of ferrous chlorid and oxidizing the precipitated-ferrous hydroxid at temperatures substantially between 105° and 130° F.

In testimony whereof I affix my signature.

PETER FIREMAN.